United States Patent
Gehlot et al.

(10) Patent No.: US 7,307,615 B2
(45) Date of Patent: Dec. 11, 2007

(54) METHOD AND APPARATUS FOR VOICE-CONTROLLED GRAPHICAL USER INTERFACE POINTING DEVICE

(75) Inventors: Narayan L. Gehlot, Sayreville, NJ (US); Victor B. Lawrence, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 612 days.

(21) Appl. No.: 10/638,183

(22) Filed: Aug. 8, 2003

(65) Prior Publication Data

US 2005/0030280 A1 Feb. 10, 2005

(51) Int. Cl.
*G09G 5/00* (2006.01)
*G09G 5/08* (2006.01)

(52) U.S. Cl. .............. 345/156; 715/728; 345/157
(58) Field of Classification Search ........ 345/156–184; 715/727, 728, 812, 813, 821–823, 844, 859, 715/860
See application file for complete search history.

(56) References Cited

U.S. PATENT DOCUMENTS

| | | | |
|---|---|---|---|
| 5,631,669 A * | 5/1997 | Stobbs et al. ............ 345/163 |
| 5,818,423 A * | 10/1998 | Pugliese et al. .......... 345/157 |
| 6,230,287 B1 | 5/2001 | Pinard et al. ............... 714/31 |
| 6,232,539 B1 | 5/2001 | Looney et al. .............. 84/609 |
| 6,233,559 B1 | 5/2001 | Balakrishnan ............. 704/275 |
| 6,424,357 B1 * | 7/2002 | Frulla et al. .............. 715/728 |
| 6,771,250 B1 * | 8/2004 | Oh ............................ 345/156 |
| 7,109,970 B1 * | 9/2006 | Miller ....................... 345/156 |
| 2003/0156130 A1 * | 8/2003 | James et al. ............... 345/728 |
| 2004/0260438 A1 * | 12/2004 | Chernetsky et al. ......... 701/36 |

FOREIGN PATENT DOCUMENTS

WO    WO 9905671 A1 * 2/1999

OTHER PUBLICATIONS

C. Schmandt, et al., "Augmenting a window system with speech input," Computer, 23, 8, 1990, pp. 50-56.
David A. Patterson et al., Computer Architecture A Quantitative Approach, Second Edition, 1996, Morgan Kaufmann Publishers, Inc., San Francisco, CA, ISBN No. 1-55860-3727, pp. 6-8, 44-50, 220-352.

* cited by examiner

*Primary Examiner*—Jimmy H. Nguyen

(57) ABSTRACT

A pointing device is provided for use in computing devices comprising a printed circuit board, a tracking device adapted to generate a tracking signal in response to a user vocal input and relay the tracking signal to the printed circuit board, and a selection device adapted to generate a selection signal in response to a user manipulation and relay the selection signal to the printed circuit board.

12 Claims, 6 Drawing Sheets

| ICON NAME (KEYWORD) | ICON POSITION (X) | ICON POSITION (Y) |
|---|---|---|
| MY COMPUTER | 10 | 20 |
| MY COMPUTER (TEXT AREA) | 10 | 60 |
| NETWORD NEIGHBORHOOD | 10 | 100 |
| INBOX | 10 | 110 |
| INBOX (TEXT AREA) | 10 | 151 |

METHOD AND APPARATUS FOR VOICE-CONTROLLED GRAPHICAL USER INTERFACE POINTING DEVICE

FIELD OF THE INVENTION

The present invention generally relates to the field of computers, and more particularly relates to a pointing device for a computer.

BACKGROUND OF THE INVENTION

A pointing device for use with a computer is well known. Existing pointing devices, such as a mouse, combine tracking and selecting functions into one device. Tracking involves physically moving the mouse to control the motion of an on-screen pointer or other icon. Physical movement of the mouse is typically accomplished by moving the wrist and palm of the hand gripping the mouse. Once tracking has moved the pointer, an operation may be selected for execution by the computer, typically by depressing a button on the mouse.

A computer user relies significantly on his or her hand (particularly on the wrist, palm and fingers) to use a mouse for executing computer operations. Unfortunately, the use of a computer mouse over extended periods of time has been shown to be a leading cause of many different types of repetitive motion injuries (RMI) to body parts including the wrists, fingers, shoulders, and elbows, e.g., Carpal Tunnel Syndrome (CTS). Individuals in many fields of work rely on computers in their daily work and are thus forced to use a mouse quite extensively. Early injuries to children may even be incurable, rendering the injured child permanently disabled.

One common solution for relieving strain on a computer user's hands and wrists is to enable the computer system to be at least partially operated by the user's voice commands. For example, commercially available voice recognition software allows a user to perform word processing operations by dictation rather than by typing. However, a significant drawback to conventional voice operated software applications is that they are susceptible to receiving background noise as well as the user's voice commands, distorting the audible input into the system. This leads to inaccuracy in the performance of the user's commands, and the mistakes can be very time consuming to fix.

SUMMARY OF THE INVENTION

The present invention overcomes the above-described limitations by providing a pointing device for use in computing devices comprising a printed circuit board, a tracking device adapted to generate a tracking signal in response to a user vocal input and relay the tracking signal to the printed circuit board, and a selection device adapted to generate a selection signal in response to a user manipulation and relay the selection signal to the printed circuit board.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

The present invention provides an improved pointing device for assisting computer users having poor or limited hand motor skill control or eyesight and for reducing the occurrence of repetitive motion injuries in physically unimpaired users. The present invention achieves this aim allows a user to manipulate an on-screen pointer and launch system applications by means of vocal commands. Thus both tracking and selecting can be achieved with little or no need to engage other parts of the body such as the hands and wrists Furthermore, embodiments of the invention provide an improved system for acquiring vocal/audible input from a computer user, so that erroneous inputs such as background noise and/or vocal irregularities of the user are filtered out to optimize system accuracy.

Figure 1:
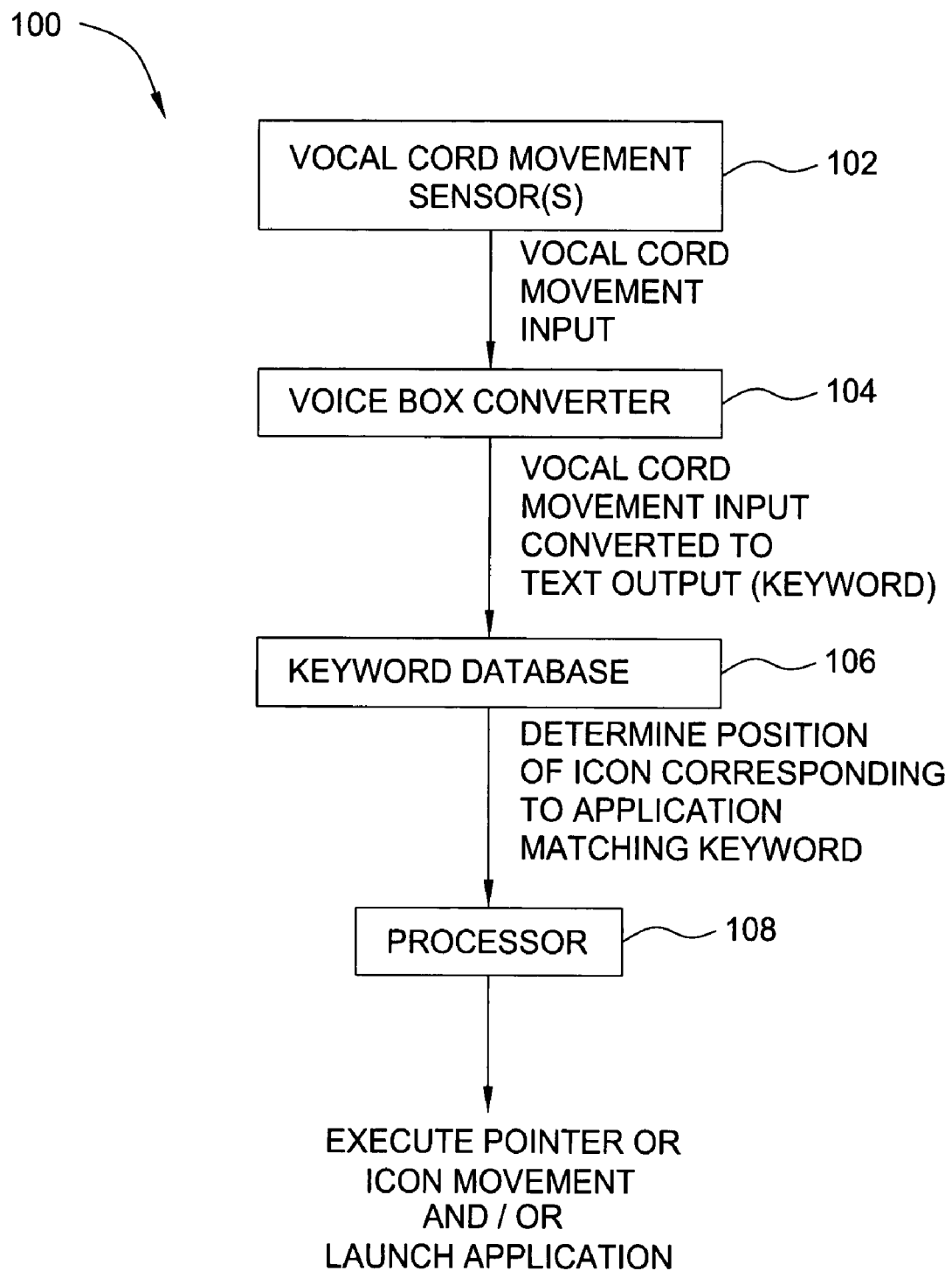
FIG. 1 depicts a diagram graphically illustrating components of a pointing device system according to one embodiment of the invention.

The basic operation of one embodiment of a pointing device system according the present invention is illustrated in FIG. 1. Operation of the pointing device system 100 is accomplished at least in part by the vocal commands of a computer user. The pointing device system 100 includes at least one vocal cord movement (VCM) sensor 102, a voice box converter (VBC) 104, and a keyword database 106. The pointing device system 100 may determine the position of the icon corresponding to application matching keyword. The pointing device system 100 generates an output to the processor 108, which executes the indicated commands or pointer or icon movements. Once the pointer or icon has been moved to the desired on-screen location, the user generates a signal to launch (or "select") the chosen application. The system 100 optionally generates an audible output to indicate the new pointer position or open application, so that, for example, a blind user may use the pointing device system 100 effectively.

Figure 2:
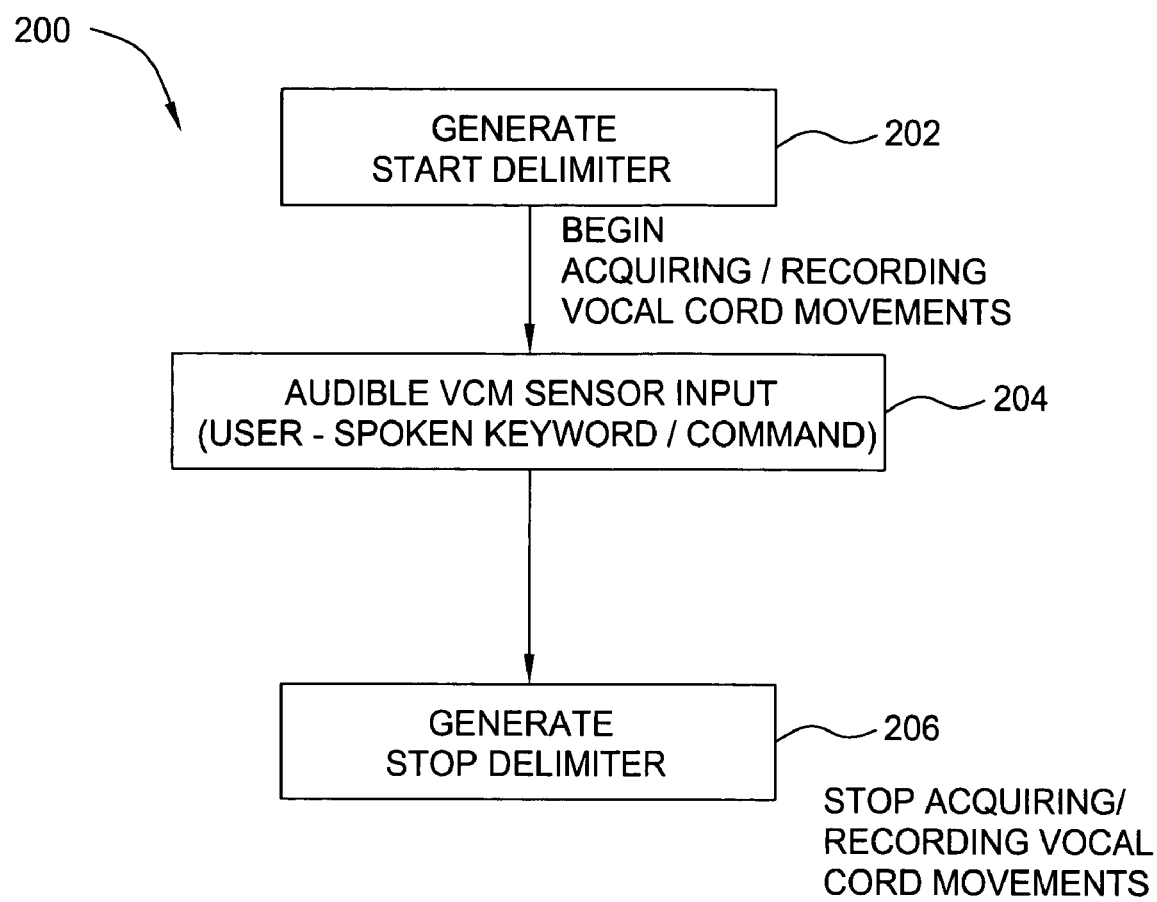
FIG. 2 depicts a flow diagram of a method for acquiring user input via a pointing device according to one embodiment of the invention.

FIG. 2 depicts a flow diagram of one embodiment of a method 200 for acquiring user input via a pointing device according to one embodiment of the invention. At least one VCM sensor 102 is positioned near a user's voice box (larynx). The user starts acquisition of vocal command data by activating a start delimiter 202. Activation of the start delimiter 202 starts acquisition/recording of vocal cord movements. Next, the user provides audible input 204 to the VCM sensor 102 by speaking into a converter system the keyword(s) corresponding to the movement or application the user wishes to execute. As the user speaks, the sensor 102 discerns movement of the user's vocal cords and records these movements. To stop the acquisition of vocal input 204 by the system, the user activates a stop delimiter 206 that causes the VCM sensor 102 to cease recording vocal cord movements. Optionally, the start and stop delimiters 202, 206 may comprise one delimiter device that is activated once to commence and once more to cease recording. The activation of a delimiter 202, 206 before and after speech filters extraneous noise (such as background noise) that may distort the vocal input 204. The recorded vocal cord movements are then sent as input to the VBC 104.

One VBC that may be advantageously adapted for use with the present invention is commercially available from Lucent Technologies Inc. of Murray Hill, N.J. The VBC 104 converts the input from the VCM sensor(s) 102 into text output, and sends this text output to the keyword database 106 for further processing and indexing. The VBC output is also used by software to train a personal user dictionary for alphabets, words and mouse commands, so that vocal input from a particular user is easily and accurately converted to output that the processor 108 can recognize and use to execute commands. Such software is well known in the art.

Figure 3:
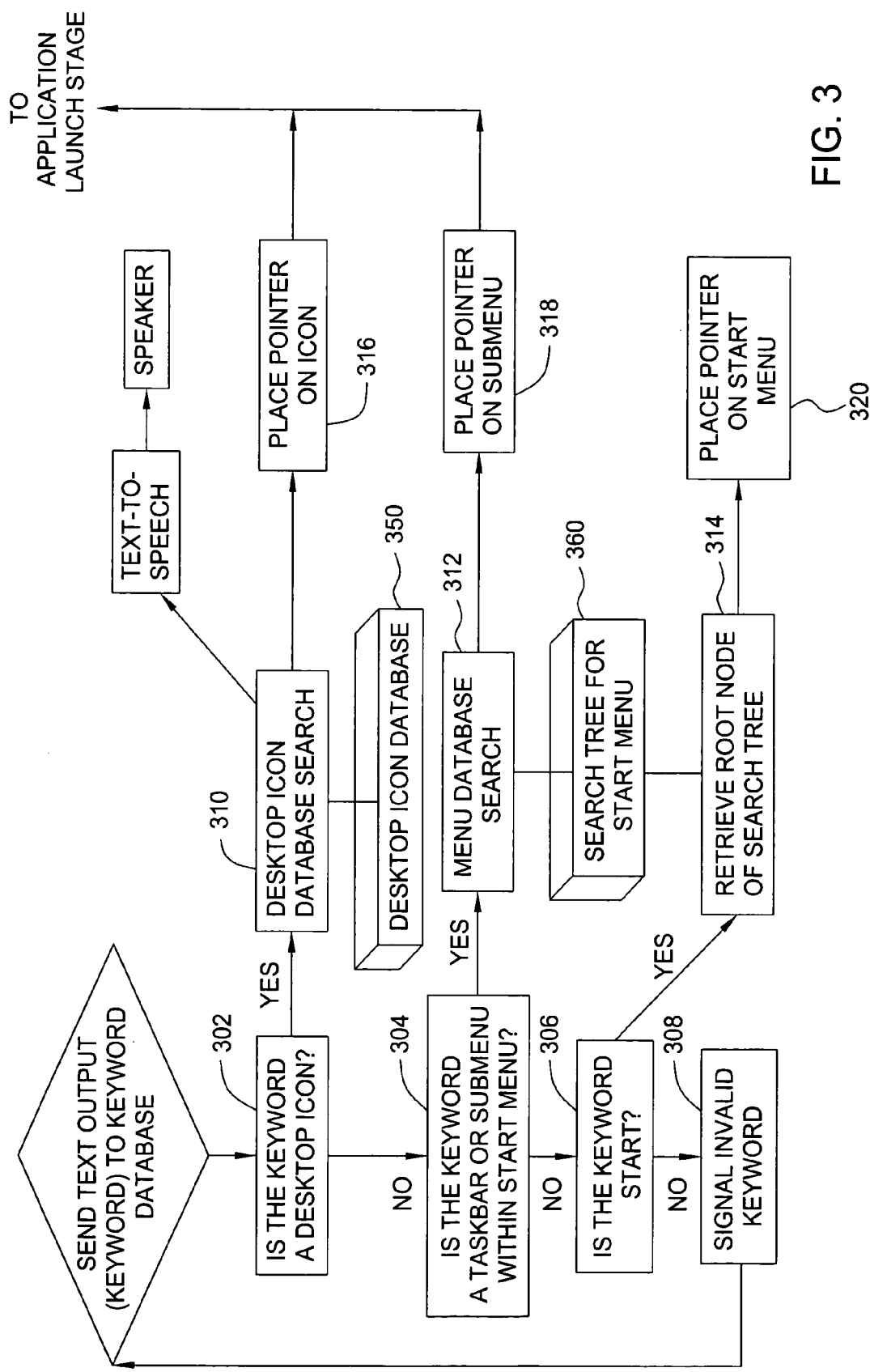
FIG. 3 depicts a flow diagram of a method of indexing user input according to one embodiment of the invention.

The keyword database 106 is coupled to the VBC 104 and further includes a desktop icon database 350 and a menu search tree 360 (see FIG. 3). The keyword database 106 indexes text output from the VBC 104 to determine the position of an on-screen icon or operation corresponding to the application that matches the keyword (user vocal input) processed by the VCM sensor/VBC operations.

FIG. 3 depicts a flow diagram of a method 300 of indexing user input according to one embodiment of the invention. In general, a spoken keyword corresponds either to a desktop icon or to a menu. In steps 302-308, the keyword database 106 asks whether the spoken keyword corresponds to a desktop icon (302), a submenu (304), or the start menu (306), or whether the vocal input does not match any keyword at all (308). Once the keyword has been categorized, the appropriate database 350 or search tree 360 is searched in steps 310-314 for an exact match to an icon or menu.

Figures 4A, 4B:
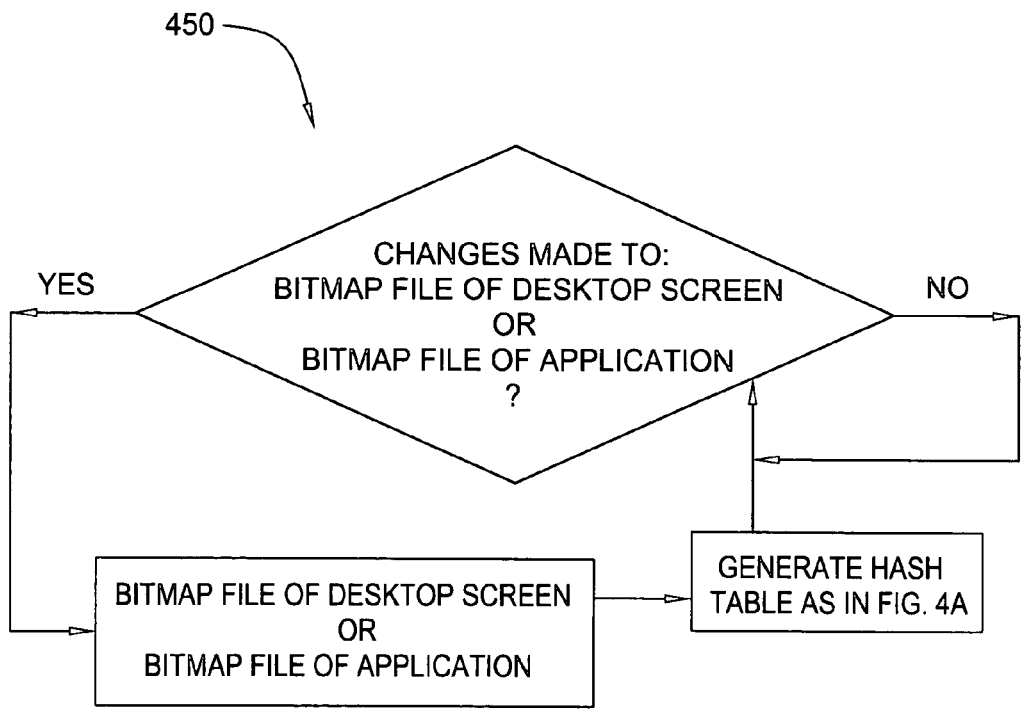
FIG. 4A depicts a hash table illustrating an indexing database according to one embodiment of the invention.
FIG. 4B depicts a flow diagram of a method for updating a hash table such as that illustrated in FIG. 4A.

FIG. 4A depicts a hash table 400 illustrating an indexing database according to one embodiment of the invention. Referring simultaneously to FIGS. 3 and 4A the desktop icon database 350 is a hash table 400 that maps icon names or keywords 402 to specific positions (X, Y) 404 within the desktop area. For example, if the keyword 402 corresponds to a desktop icon, a search in the desktop icon database 350 will determine the actual position 404 of the indicated icon in the desktop area, and the on-screen pointer will be moved to that position on the desktop screen (step 316 in FIG. 3. The generation of the process of the hash table 400 is illustrated in FIG. 4B and will be discussed in further detail herein.

The menu search tree 360 operates in a manner similar to the desktop icon database 350. However, the menu search free 360 maps names and keywords of submenus within the start menu (for example, the Accessories or Multimedia submenus in Windows), rather than names and locations of desktop icons. The on-screen pointer is then positioned an the appropriate submenu (step 318 in FIG. 3). If the user does not know the keyword for the desired submenu, the "Start" keyword will retrieve the root node of the menu search tree 360 (step 314) and position the pointer over the Start menu (step 320), which may be searched for the appropriate submenu.

In the event that the user input does not match a keyword in either the desktop icon database 350 or the menu search tree 360, a signal is generated in step 308 to indicate to the user that the input is not valid. In one embodiment, the signal is an audible signal, such as a beep.

Once the pointer has been moved to the desired on-screen location, the user generates a signal to launch the chosen application. In one embodiment, the launch signal is indicated by depressing a button on a conventional mouse. For example, depression of the left mouse button on a conventional two- or three-button mouse optionally indicates selection of an application. In further embodiments, alternate means of generating selection input to the mouse PCB may be used.

Figure 5:
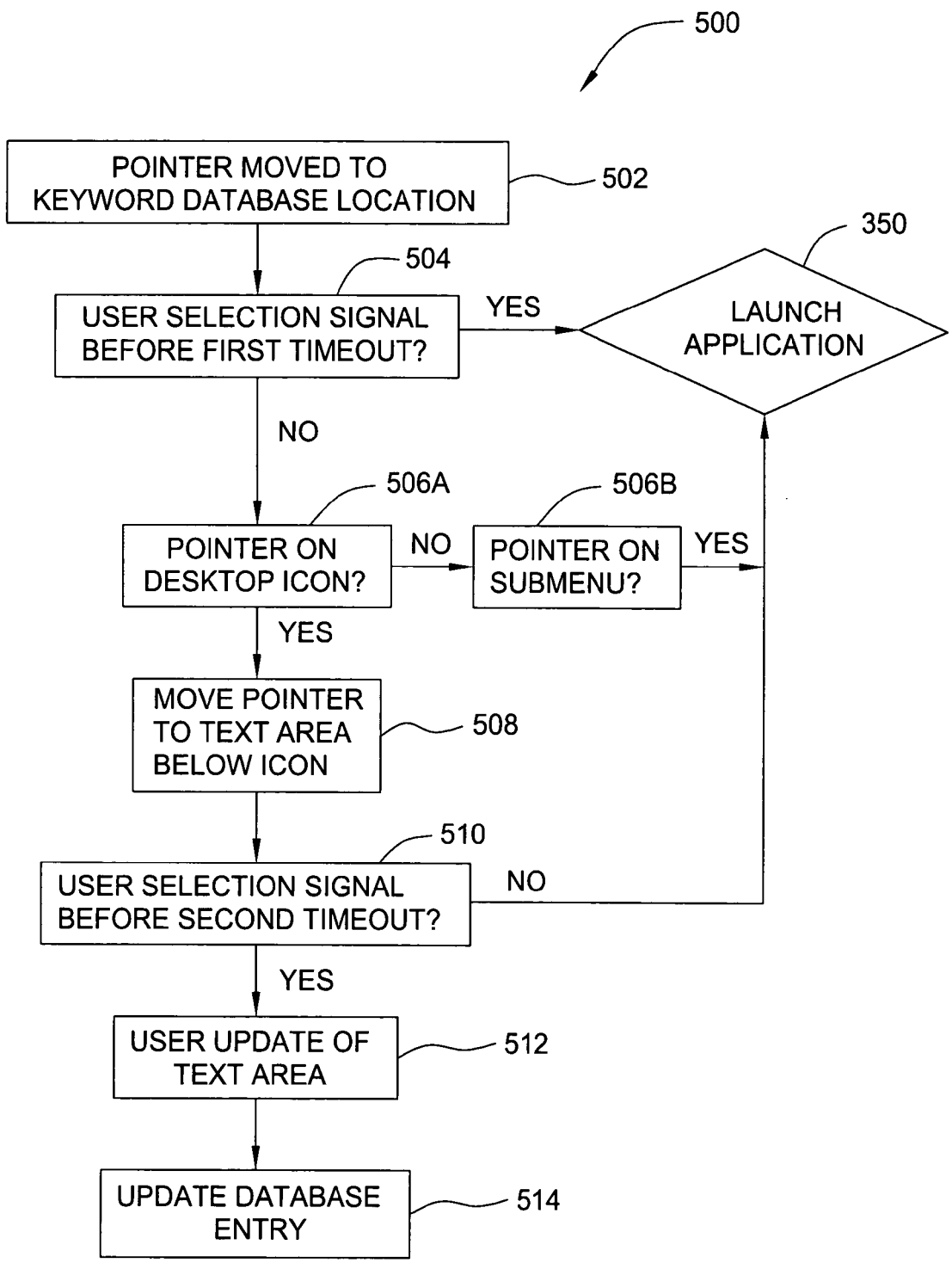
FIG. 5 depicts a flow diagram of a processing sequence by which computer applications are launched according to one embodiment of the invention.

FIG. 5 depicts a flow diagram of a processing sequence 500 by which a processor 108 launches computer applications according to one embodiment of the invention. The processing sequence 500 operates on a series of timed intervals during which the user must activate a launch signal or allow a default operation to be executed. For example, once the on-screen pointer has been moved to an indicated location in step 502, (based on the database keyword matches described herein), a first timed interval begins to run. If the user wishes to launch the application on which the pointer is positioned, he signals so, for example by depressing a mouse button as described, before the first timeout in step 504. A selection signal before the first timeout prompts the processor 108 to launch the chosen application (step 350). If no signal is received from the user, the processor 108 determines in step 506 whether the pointer is positioned on a desktop icon (506a) or a submenu (506b). If the pointer is positioned on a submenu (506b), that application is launched (350). If the pointer is positioned on a desktop icon (506a), the processor 108 moves the pointer, in step 508, to a text area associated with the icon (located, for example, below the icon), and a second timed interval begins to run. If the processor 108 receives a signal from the user before the second timeout (step 510), the user is enabled to update or alter the text in the text area in step 512, and a database entry for the icon is updated accordingly in step 514. The process 450 by which the icon database hash table 400 is updated is illustrated in FIG. 4B. If no signal is received from the user, the application is launched (350). In this manner, if no signal or signals are received from the user at any point in the processing sequence 500, the default operations of the processing sequence 500 are programmed to execute the probable intentions of the user in pointing to the indicated icon or submenu.

Figure 6:
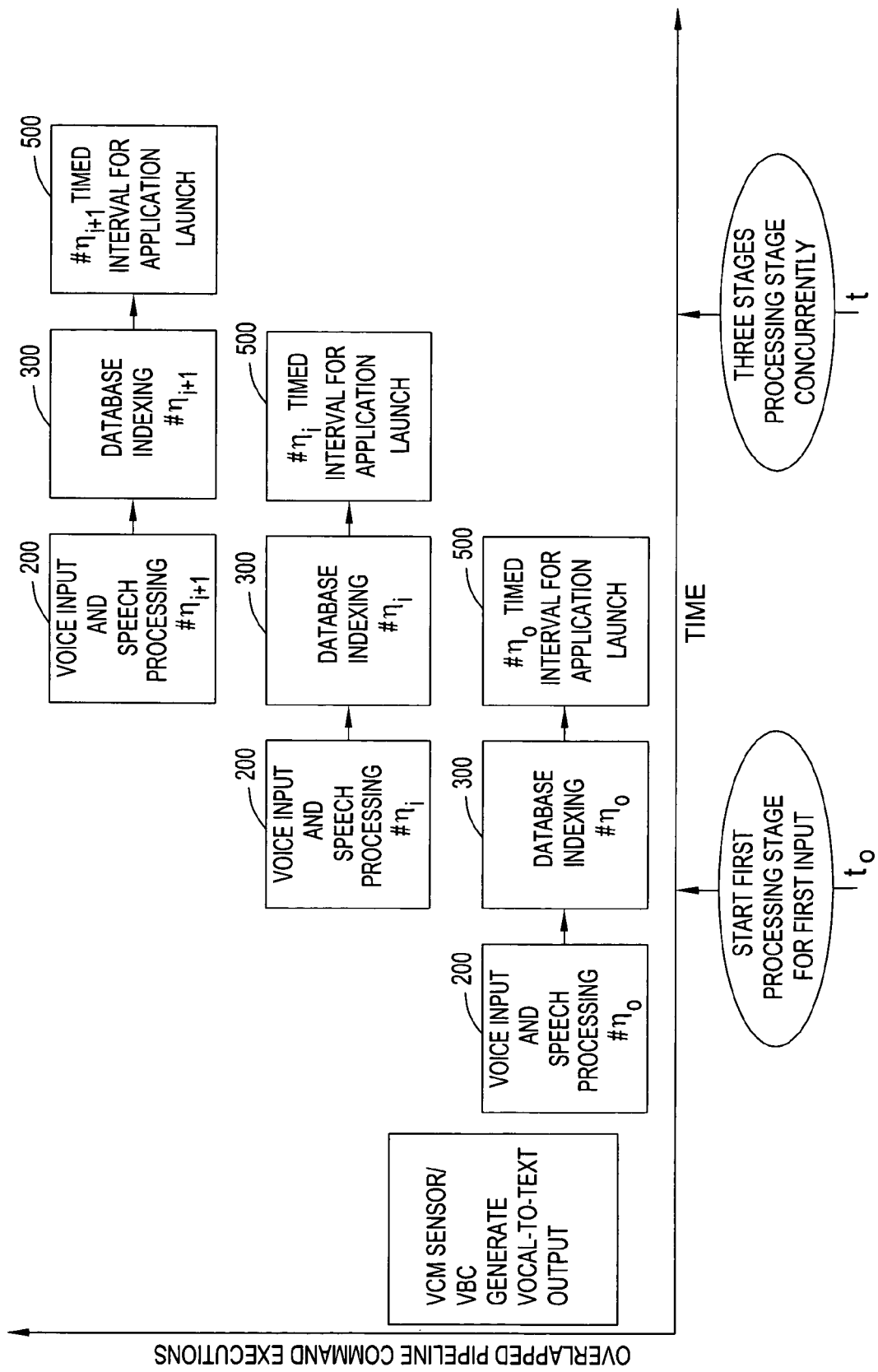
FIG. 6 depicts a graphical representation of a pipeline sequence for acquiring and indexing input and launching applications according to one embodiment of the invention.

FIG. 6 depicts a graphical representation of a pipeline sequence for acquiring and indexing input and launching applications according to one embodiment of the invention. The three main stages 200, 300, 500 in the pointing device system processing sequence are performed concurrently in a pipeline system. That is, the stages 200, 300, 500 overlap so that after three cycles $n_0$, $n_i$, $n_{i+1}$ of vocal command acquisition 200 (FIG. 3 2), database indexing 300 FIG. 3), and application launch 500 (FIG. 5, the stages 200. 300, 500 operate and process input concurrently at time t. Therefore, if a subsequent vocal command is acquired 200 immediately after a previous acquired command has been processed (i.e., indexed 300), the execution speed of the system 100 is approximately three times faster than a conventional sequential processing system.

Once an application is launched 500 the pointer is repositioned within the launched application. The launched application may be any application capable of being operated by the computer, such as a word processing program, a video game or a web browser. In one embodiment, the launched application is a web browser such as Microsoft Internet Explorer.

One embodiment of a typical web browser includes such user-executable icons as hyperlinks, buttons and menus. The purposes and operations of such icons are well known in the art. The keyword database 106 stores keywords for all hyperlinks buttons and menus in all active (launched) applications, as well as the respective positions (X, Y) of each hyperlink, button and menu within the application. In addition, the keyword database 106 stores keywords and positions for all similar executable icons in other applications (i.e., word processing programs, video games, etc.).

The method of tracking (positioning) and selecting (launching) with the pointer to launch a particular action within an application is substantially similar to the method illustrated in FIGS. 1-5 to launch the application. For example, if a user wishes to position the pointer on a particular hyperlink or button, he starts acquisition of vocal command data 200 by activating the start delimiter 202. Next, the user speaks into the converter system (i.e., VCM sensor 102) the keyword(s) corresponding to the hyperlink or button the user wishes to launch. To stop the acquisition of vocal input by the system, the user activates the stop delimiter 206. The acquired audible input is then converted into text form by the VBC 104, which launches the corresponding hyperlink or button by the method discussed with reference to FIG. 5.

If a user knows the keyword for a particular submenu (for example, the Save command within the File menu) he wishes to launch or explore, he can launch it by the same method hyperlinks and buttons are launched (i.e., speak the keyword—"Save"—in between activating the delimiters 202, 206). If the user does not know the keyword, he may speak the keyword for the whole menu ("File"). Exploration of the menu is then automatic; the pointer is positioned upon a submenu for brief interval of time (such as in step 504 of FIG. 5), during which the user may signal (for example, by clicking a button) to launch the submenu or take no action. Taking no action will cause the processor to position the pointer upon the next submenu and repeat the process of allowing a brief interval for user input.

Switching between active applications (multitasking) may also be accomplished by vocal command In one embodiment, the keyword "Active" is used to distinguish between a launched application and a new (but as yet unlaunched) application. If multiple applications of the same type are already launched, the keyword prompts the processor 108 to move the on-screen pointer from one application to the next. The pointer remains on each application for a brief interval (again similar to step 504 in FIG. 5) to allow the user to signal acceptance of an application. If no signal is given, the pointer is moved to the next application upon timeout.

Thus the present invention represents a significant advancement in the field of computer usage and computer pointing device systems. A graphical user interface pointing device system is provided that substantially reduces the occurrence of repetitive motion injuries caused by conventional pointing devices. The system is suitable for use with standard desktop and laptop computers, as well as next-generation embedded computing devices like hand held devices and web browsing devices that operate through television sets. Furthermore, the inaccuracies associated with conventional voice-operated software are substantially reduced by the delimiting functions of the present invention, which filter background noise and vocal irregularities in the system input. Therefore, the present invention may be particularly well-suited for use by users who are deaf, ill, or have poor or limited hand motor skill control, as well as physically unimpaired users who may benefit from a hand-free pointing device system (such as those dictating in public places or while otherwise occupied).

While the foregoing is directed to embodiments of the invention, other and further embodiments of the invention may be devised without departing from the basic scope thereof, and the scope thereof is determined by the claims that follow.

What is claimed is:

1. A method for executing computer commands using a pointing device, comprising the steps of:
    acquiring a vocal input from a user;
    indexing the vocal input through a command database;
    moving an on-screen pointer to a position indicated by the indexing of the vocal input through the command database; and
    launching a computer application corresponding to the position of the on-screen pointer if an application selection signal is activated before expiration of a first timed interval;
    activating a default selection processing sequence if the application selection signal is not activated before expiration of the first timed interval, wherein the default selection processing sequence comprises the steps of determining the position of the on-screen pointer and executing an action in response to the position of the on-screen pointer.

2. The method of claim 1, further comprising the step of:
    generating an audible output to alert the user to the position of the on-screen pointer.

3. The method of claim 1, wherein the step of acquiring the vocal input comprises the steps of:
    activating a first delimiter to initiate vocal input acquisition;
    recording a user's vocal cord movements; and
    activating a second delimiter to cease vocal input recording.

4. The method of claim 1, wherein the step of acquiring the vocal input further comprises converting the user's vocal cord movements to a text output.

5. The method of claim 1, wherein the step of indexing the vocal input comprises comparing the acquired vocal input to at least one keyword stored in a database to identify a keyword that corresponds to the vocal input.

6. The method of claim 5, wherein the step of comparing the acquired vocal input to the at least one keyword comprises determining whether the vocal input corresponds to a keyword for a desktop icon, a submenu or the start menu.

7. The method of claim 1, further comprising the step of:
    launching a corresponding application if the on-screen pointer is determined to be positioned on a submenu.

8. The method of claim 1, further comprising the steps of:
    moving the on-screen pointer to a text area associated with a corresponding desktop icon if the on-screen pointer is determined to be positioned on a desktop icon; and
    running a second timed interval.

9. The method of claim 8, further comprising the steps of:
    launching an application corresponding to the desktop icon if a selection signal is not activated before expiration of the second timed interval.

10. The method of claim 9, further comprising the steps of:

enabling the user to alter the text area if a selection signal is activated before expiration of the second timed interval; and updating a database entry for the desktop icon to include the user-made alterations.

11. A method for executing computer commands using a pointing device, comprising the steps of:

acquiring a first vocal input from a user;

indexing the vocal input through a command database;

launching a computer application indicated by the vocal input; and acquiring a second vocal input substantially concurrently with the commencement of indexing of the first vocal input;

wherein the steps of acquiring vocal input, indexing the acquired vocal input, and launching the application are performed in a continuous cycle for as long as the user provides vocal input.

12. The method of claim 11, wherein steps of acquiring a third vocal input, indexing said second vocal input, and launching said computer application indicated by said first vocal input are performed substantially concurrently.

* * * * *